United States Patent [19]

Tank

[11] Patent Number: 5,024,684
[45] Date of Patent: Jun. 18, 1991

[54] MULTI-STAGE VORTEX REACTOR

[75] Inventor: John T. Tank, San Diego, Calif.

[73] Assignee: Pyropower Corporation, San Diego, Calif.

[21] Appl. No.: 506,593

[22] Filed: Apr. 6, 1990

Related U.S. Application Data

[63] Continuation of Ser. No. 351,822, May 12, 1989, abandoned.

[51] Int. Cl.⁵ .............................................. B01D 47/00
[52] U.S. Cl. .......................................... 55/92; 55/338;
55/349; 55/419; 55/459.5; 422/168; 423/242;
159/4.05; 159/4.09
[58] Field of Search ................... 55/92, 230, 235, 349,
55/238, 338, 261, 459.5, 419; 159/4.05, 4.09;
423/242, 659; 422/168

[56] References Cited

U.S. PATENT DOCUMENTS

| | | | |
|---|---|---|---|
| 755,430 | 3/1904 | Allington | 55/341 |
| 3,034,647 | 5/1962 | Giesse | 209/144 |
| 3,507,397 | 4/1970 | Robinson | 210/512 |
| 4,212,653 | 7/1980 | Giles | 55/1 |
| 4,511,474 | 4/1985 | Krishna | 210/512.1 |
| 4,652,363 | 3/1987 | Miller | 209/211 |

FOREIGN PATENT DOCUMENTS

| | | |
|---|---|---|
| 1014936 | 8/1957 | Fed. Rep. of Germany . |
| 860955 | 9/1987 | Finland . |
| 717238 | 10/1954 | United Kingdom ............... 159/4.05 |
| 1141196 | 1/1969 | United Kingdom . |
| 1183912 | 3/1970 | United Kingdom . |

*Primary Examiner*—Bernard Nozick
*Attorney, Agent, or Firm*—Baker, Maxham, Jester & Meador

[57] ABSTRACT

A multistage vortex reactor for contacting a gas stream with a gas, a fluid or other stream, comprising a housing having end walls and a peripheral side wall defining an elongated generally cylindrical vortex chamber having an inlet end and an outlet end, a first inlet in the inlet end of the vortex chamber for introducing a first gas stream in a swirling motion into the vortex chamber, a second inlet for introducing a second gas stream adjacent the inlet end of the vortex chamber for flowing around at least a part of the vortex chamber for separating the first stream from said chamber walls, a supply duct divides a gas stream into at least a first gas stream and a second gas stream and introduces the first gas stream into the first inlet in the vortex chamber and the second gas stream into the second inlet, an injector for introducing a liquid into the first gas stream in the vortex chamber, and an outlet for continuously removing gas from the vortex chamber.

31 Claims, 5 Drawing Sheets

MULTI-STAGE VORTEX REACTOR

This is a continuation of application Ser. No. 351,822, filed on May 12, 1989, now abandoned.

BACKGROUND OF THE INVENTION

The present invention relates to vortex reactors and pertains particularly to an improved method and apparatus for enhancing the process reaction between gases and reactants (in the form of particles or liquid droplets).

Reactions between gases and particles or slurry droplets are common in many industrial processes. In many instances, the particles or slurry droplets are sticky and are troublesome, because they can stick to the reactor walls during the course of reaction and processing through the reactor. One prior art approach to reducing or eliminating this problem is the provision of very large reaction vessels to prevent the deposition of sticky particles on the reactor walls. Another approach is to apply very high energy to the slurry atomization in order to prevent the solid deposition from happening.

Current dry processes for flue gas desulfurization with atomized lime slurry require high energy for slurry atomization or a long reactor vessel to prevent the sticky lime slurry particles from depositing on the reactor wall and plugging up the reactor ducts.

It is, therefore, desirable that an improved reactor vessel and process be available for controlling the reaction between gases and reactants (in the form of particles or liquid droplets) that will prevent the particles from sticking to the vessel walls.

SUMMARY AND OBJECTS OF THE INVENTION

It is, therefore, the primary object of the present invention to provide an improved reactor vessel and process for controlling the reaction between gases and reactants (in the form of particles or liquid droplets) in order to prevent the particles from sticking to the vessel walls.

In accordance with the primary aspect of the present invention, a vortex reactor is provided with multiple stage gas entrances for promoting the mixing between gases and materials such as slurry droplets and/or solid particles, and to prolong reacted particles in reactor residence time and prevent sticky particles from reaching the reactor wall before drying out and/or becoming free of stickiness. The process, in accordance with the invention, includes dividing the gases into first and second flows, with the fluid injection into the first flow, and introducing of the second flow at a position downstream from the first flow at an angle that enhances reaction and reduces the rate of travel of the particles toward the reactor wall.

BRIEF DESCRIPTION OF THE DRAWINGS

The above and other objects and advantages of the present invention will become apparent from the following description when read in conjunction with the drawings wherein.

DETAILED DESCRIPTION OF THE PREFERRED EMBODIMENTS

Figure 1:
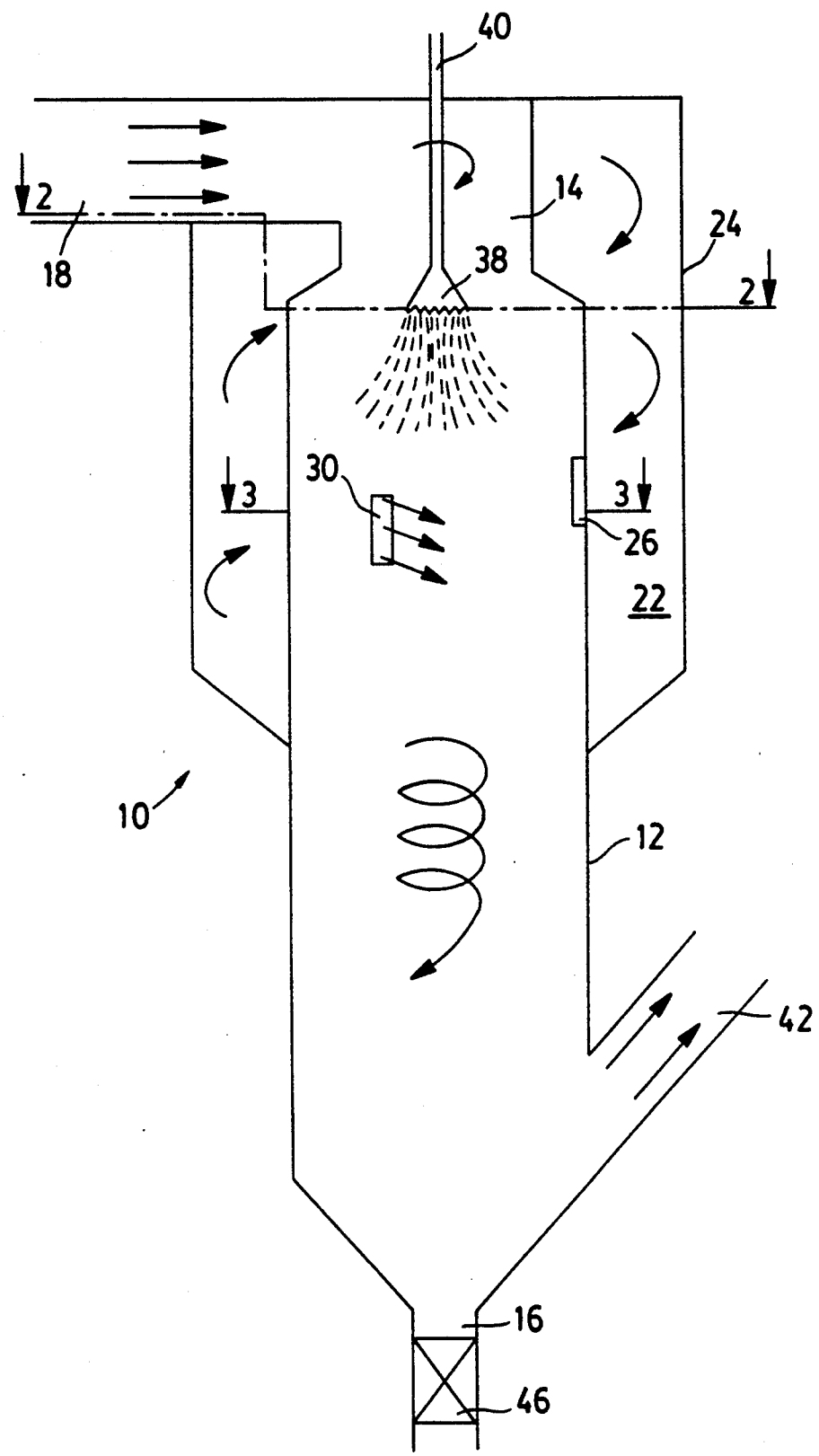
FIG. 1 is a side elevation view schematically illustrating a multi-stage vortex reactor in accordance with the invention.

Referring now to FIG. 1 of the drawings, there is schematically illustrated a multi-stage vortex reactor, in accordance with the present invention, designated generally by the numeral 10. The reactor comprises an elongated cylindrical first housing 12, defining a reactor with a vortex chamber, having an inlet 14 at an upper end and an outlet duct 16 at a lower end. At the upper or inlet end of the reactor, there is provided a first reactor gas inlet duct 18 for the introduction of a first stream of gas.

Figure 2:
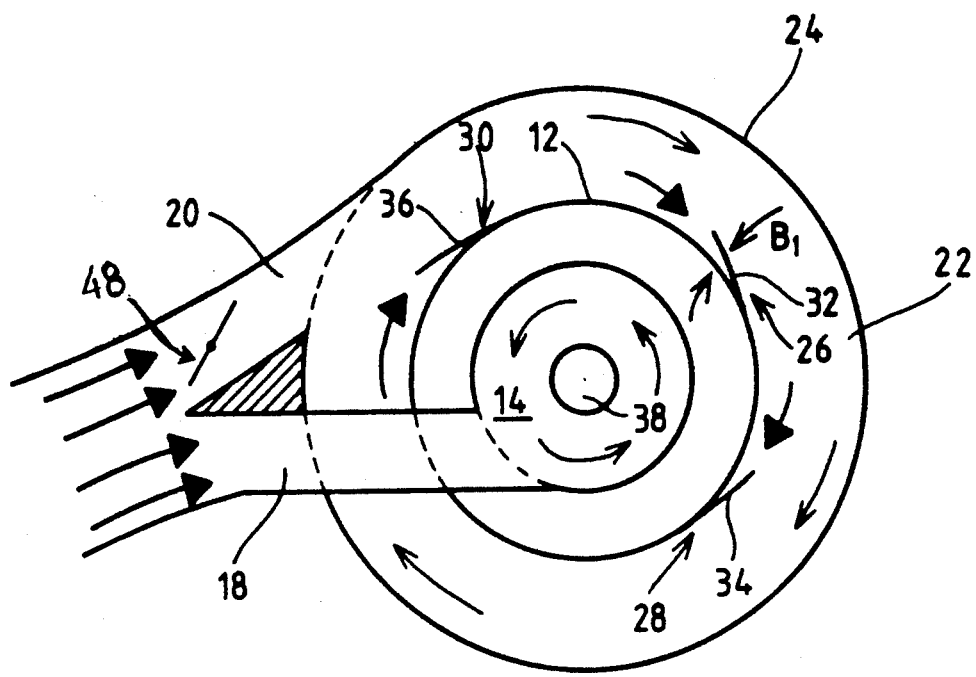
FIG. 2 is a top plan view in section schematically illustrating the gas flow and inlet arrangement in accordance with a first embodiment of the invention.

Referring to FIG. 2, the first stream of gas enters via inlet duct 18 at a tangent to the circular opening of the inlet 14 in the upper end of the vortex chamber, causing the inlet gases to swirl around in a counter-clockwise direction. As also illustrated in FIG. 2, a second gas inlet duct 20 is provided for the introduction of a second gas into an annular chamber 22, defined by an annular housing 24 surrounding the inlet end of the reactor housing. The annular chamber 22, defined by the outer housing 24, carries the second stream of gas in a swirling motion around the outside wall of the reactor housing 12, counter to the first inlet stream. The second gas stream is in heat exchanger contact, with the peripheral wall of the vortex chamber heating or cooling said wall. The second stream also flows axially along the reactor, wherein it enters the reactor at inlet openings 26, 28 and 30.

These inlet openings are staged circumferentially around and axially along the reactor housing, as illustrated in FIGS. 1 and 2, such that the gas flows along and around the reactor prior to entering the housing. The inlets for the second gas stream have inlet angle directing devices in the form of outward extending guide plates or baffles 32, 34, and 36 that direct the gas into the vortex chamber at a particular tangential angle for flowing around at least a part of inner walls of the vortex chamber, which aids in controlling the rate of outer movement of the solid or slurry particles within the reactor chamber. Additionally, the second gas stream exchanges heat to the peripheral wall and raises the wall temperature that prevents sticky particles or fluid droplets from depositing at the wall.

Figure 3:
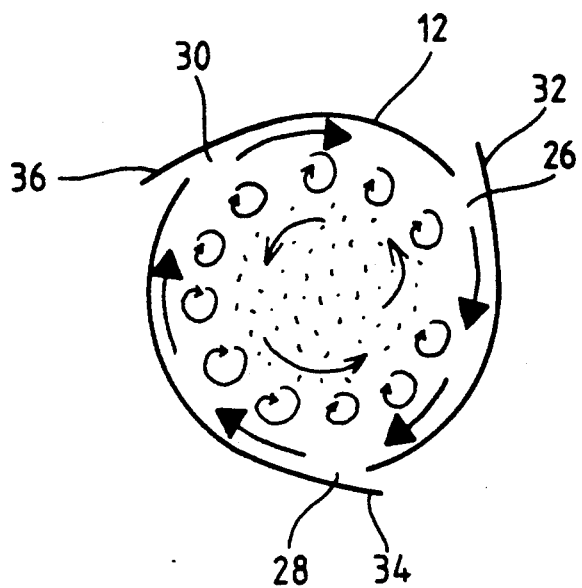
FIG. 3 is a top plan view in section schematically illustrating the gas movement in the reactor in accordance with the embodiment of FIG. 2.

Referring still to FIG. 1, a fluid injector 38 at the center inlet of the vortex chamber introduces a fluid liquid or a slurry into the chamber from a suitable source via a conduit 40. This slurry is mixed with and carried along with the first stream of gases that enter into the vortex chamber via inlet duct 18 and flow in a counter-clockwise direction in the chamber. Other materials such as gases, liquids, or solid particles may also be introduced into the chamber at this point. The term "fluid" includes gases and liquids which may or may not contain solid particles. The second stream of gas that enters the chamber is introduced at the outer surface of the chamber flowing along the wall (FIG. 3) in the opposite direction, separating the first stream and the sticky slurry particles from the inner surface of the wall until the particles have dried and moved substantially to the bottom of the reactor. As shown in FIG. 3, the counter flowing streams create small swirling currents between them as they flow along the chamber of the reactor. This counter flow arrangement prevents sticky liquid or slurry droplets from reaching the reactor wall.

At the bottom of the reactor, there is provided a solid outlet 16 (FIG. 1) and a gas outlet duct 42 for drawing of the cleaned gas from the stream. Solids that have separated from the gases drop to the bottom of the reactor and are drawn off through a suitable rotary valve 46 in the solids outlet duct 16, as illustrated.

A damper 48 (FIG. 2) in the inlet duct 20 controls the proportion of the volume of the inlet gasses between the inlets ducts 18 and 20. When the damper is in the unrestricted position, the division of flow will be in proportion to the size of the respective duct. When the damper 48 is in a restricted position partially across the duct passage, the flow in duct 20 will decrease and that in duct 18 will increase in proportion to the restriction. Thus, the damper may be used to adjust the flow split between the volume of first and second gas streams 18 and 20 in certain proportion for optimizing reactions as well as fluid mixing pattern in the reactor.

This structure and process enhances and promotes the mixing between the gases introduced into the chamber and the slurry droplets and solid particles. The process creates a strong vortex of the gas and prolongs the contact and reactant residence time and prevents the sticky particles from reaching the reactor walls.

Figure 4:
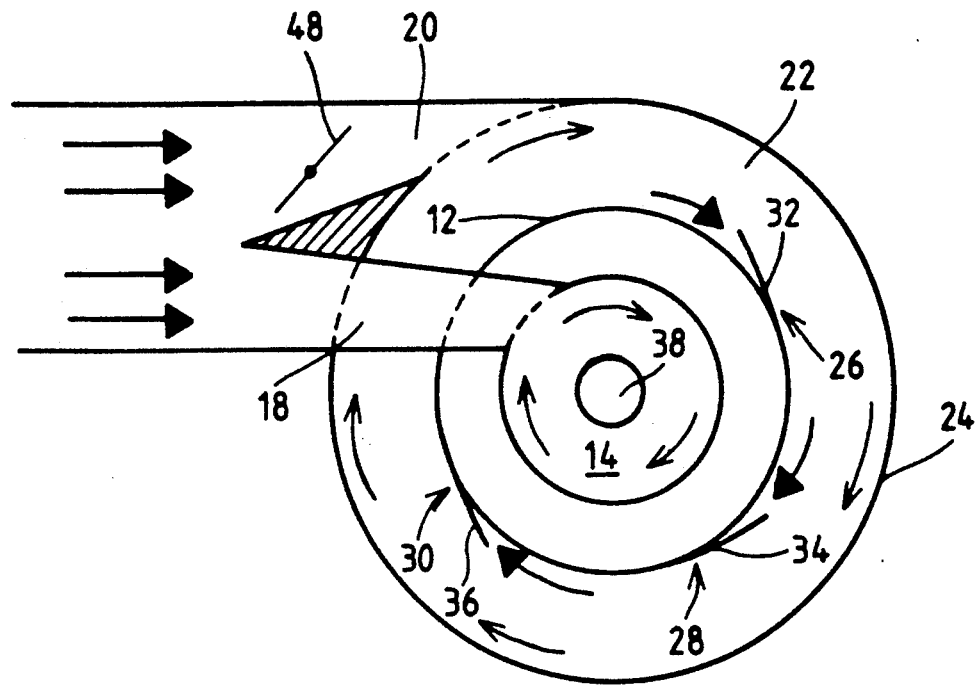
FIG. 4 is a view like FIG. 2 of a second embodiment.
Figure 5:
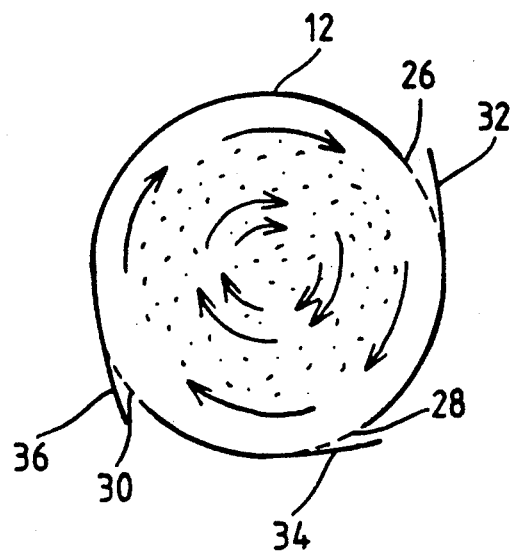
FIG. 5 is a view like FIG. 3 of the embodiment of FIG. 4.

In other applications when there is a need to recover reactants upon completing the reaction, it is preferred to have both gas streams whirling in a similar direction in the reactor. Referring to FIG. 4, wherein like numbers identify the same elements and modifications are identified by the same numbers primed, a flow arrangement is illustrated wherein the gas flow from both gas inlet ducts are in the same direction. In this arrangement, the first inlet duct 18' enters the circular opening of the inlet 14 of the vortex chamber on the same side as the second duct 20. Thus, the first and second streams are flowing in a common clockwise direction, with less turbulence as illustrated in FIG. 5. This approach promotes the particles' radial movement for its removal at the reactor bottom.

Figure 6:
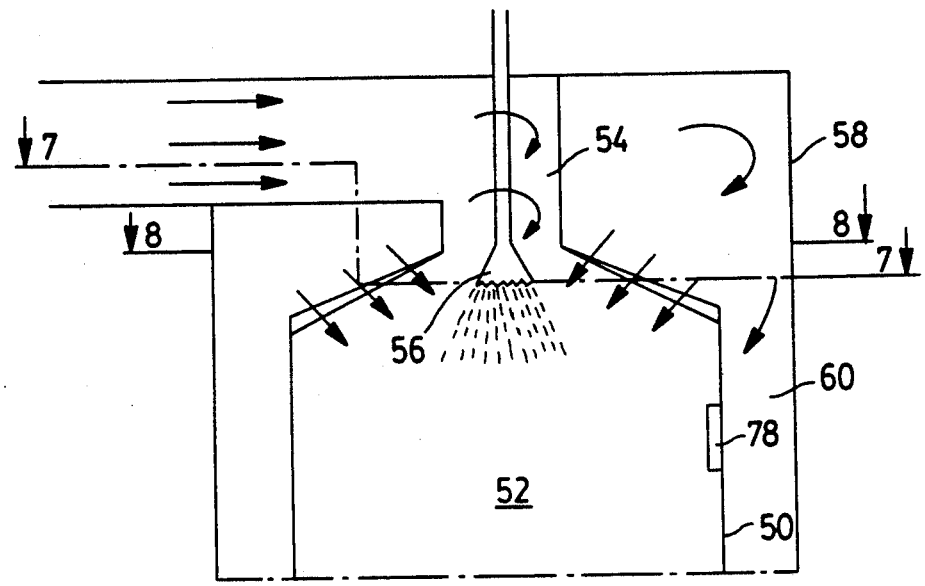
FIG. 6 is a partial side elevation view in section illustrating another embodiment of the invention.

Referring to FIG. 6, a further embodiment is illustrated wherein a main housing 50, as in the previous embodiments, defines a vortex chamber 52 into which gasses and the like are introduced. The vortex chamber has a first inlet 54 wherein a first gas stream is introduced, with a liquid or slurry injector 56 for introducing liquid or the like into the stream. The lower or bottom portion of the reactor is constructed the same as in the prior embodiments. An outer housing 58 forms an annular chamber 60 as in the prior embodiments.

Figure 7:
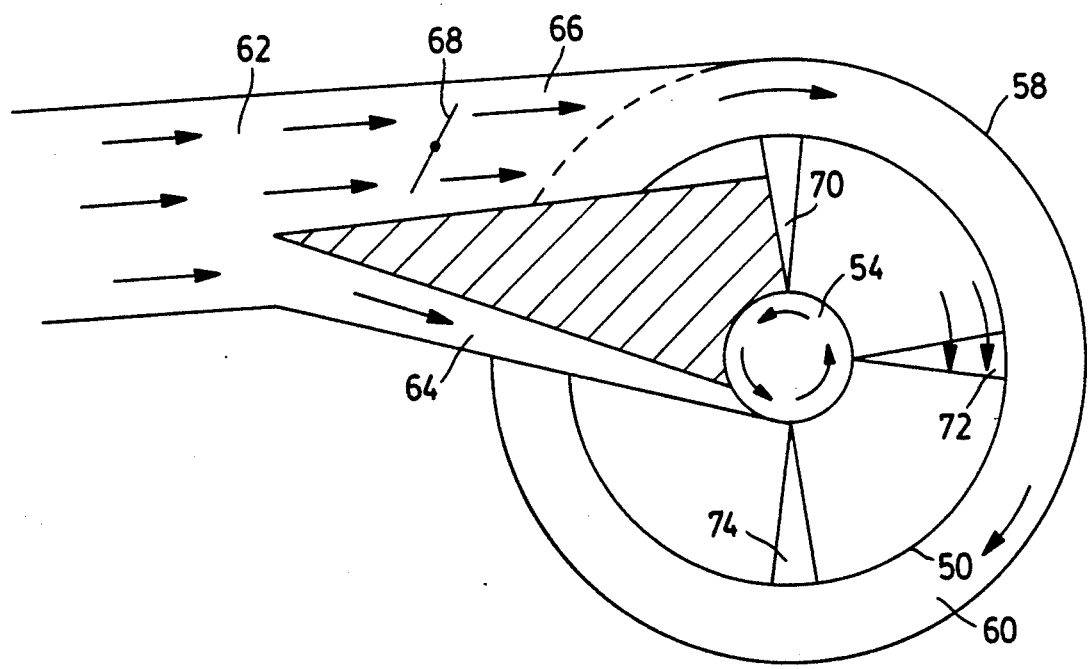
FIG. 7 is a view like FIG. 3 of the embodiment of FIG. 6.

Referring to FIG. 7, a gas stream is introduced via a duct 62, which is split into ducts 64 and 66, with the first duct directing gases into the inlet 54, and the second introducing gas into the annular chamber 60. A damper 68 controls the flow between ducts 64 and 66. The roof of the housing 50 is provided with a plurality of triangular shaped inlet opening slots 70, 72, 74, and 76 (FIG. 8) into the chamber 52 from the uppermost part of the annular chamber 60. A portion of the gas stream entering chamber 60 flows trough the opening slots 70–76, forming a stream of hot gas along the top of the chamber 52 protecting the surface of the top of the chamber from accumulation of reagent droplets. The remainder of the gas flows down along the annular chamber 60 along side of the chamber 52 along housing wall 50 and enters the chamber 52 via a plurality of inlets (only one 78 shown) as in the prior embodiments.

This apparatus and process can be applied to many chemical reaction processes in industry. One particular application is to flue gas desulfurization with injection of slurry droplets or the like. Another application of the reactor and of the process is that to processes involving gas and sticky particles reactions. This can include any number of different compositions of gas particles and the like.

Another process to which the present reactor and processes may be applied is that to the combustion of coal slurry fuel mixture in small furnaces.

In carrying out the process as above described, the steps include dividing the gas stream into a first portion directed directly to the reactor, and diverting a second portion of the gas to the reactor via wall inlets in the region where the solids and the droplets are being introduced to the reactor. The gas forms a strong vortex in its course of traveling downward and provides high slip velocity. Slip velocity is a relative velocity between gas and solid particles or slurry droplets. This promotes heat and mass transfer between the gas and reactor particles or slurry droplets, and helps to shorten the reaction time requirement as well as dry out time. Also the gas vortex prolongs particles or slurry droplet staying time in the reactor.

The second portion of the gas stream is directed toward the outer annular region of the reactor and enters the reactor via the various opening slots located axially along and radially along the reactor wall. This provides additional mixing and turbulence at various distances in the reactor down stream and prevents still sticky particles from reaching, adhering and depositing on the reactor walls.

The direction of the gas swirling in the upper region of the reactor from the second stream can be selected to be either in the same direction or opposite direction to that of the primary stream in the reactor. This could depend on a number of factors, including the types of process application, the degrees of particle stickiness and the desire for particle separation. With the opposite direction of entrance into the reactor, as shown in FIGS. 2 and 3, a deposition of still sticky particles on the reactor wall can be avoided.

Referring to FIG. 4, it is seen that the primary gas duct is divided, as in the previous embodiment, with the gas streams moving however in the same clockwise direction in the reactor. In this arrangement, the primary stream is fed into the reactor to move in a clockwise direction, as shown in FIG. 4. The second gas stream, which is controlled by a damper for controlling the proportion of the volume between the first and second streams, is also introduced into the outer chamber in the same direction, wherein it moves along and enters the reaction chamber in the same direction, as shown in FIG. 5. This arrangement of the primary and secondary gas flow in the same direction aids in solids separation from the gas stream for its recovery or removal.

Figure 8:
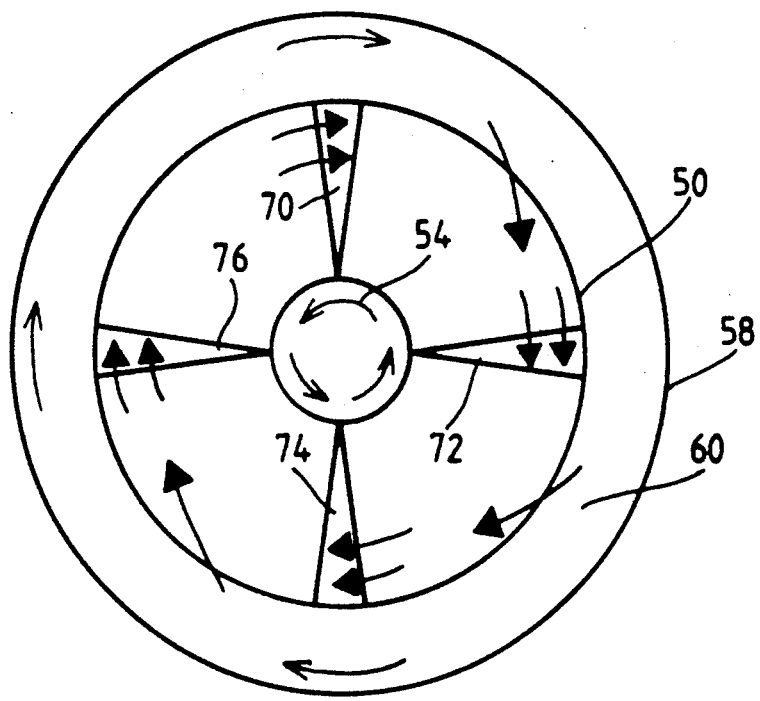
FIG. 8 is a view taken on line VIII—VIII of FIG. 6.

The FIG. 6–8 embodiment or feature of triangular slots or openings in the upper or inlet end wall of the reactor chamber can be embodied or combined with either FIGS. 2 or 4 directions of flow. This features can aid in controlling the outward velocity of the liquid and solids introduced into the chamber.

While I have illustrated and described my invention by means of specific embodiments, it is to be understood that numerous changes and modifications may be made therein without departing from the spirit and scope of the invention as defined in the appended claims.

I claim:

1. A multi-stage vortex reactor vessel for enhancing the mixing of a material into a gas stream thereby forming a mixture and for maintaining said mixture out of contact with walls of said reactor vessel, comprising:

first housing means having a first peripheral side wall defining a first elongated generally cylindrical vortex chamber having an inlet end and an outlet end;

second housing means having a second peripheral side wall defining a second elongated generally cylindrical vortex chamber, said second housing being disposed concentrically outside said first chamber;

first tangential inlet means in the inlet end of the first vortex chamber for introducing a first gas stream tangentially as a vortex flow into the first vortex chamber;

second tangential inlet means in the second vortex chamber for introducing a second gas stream tangentially as a vortex flow into the second vortex chamber;

transfer means in said first peripheral side wall adjacent said inlet end for introducing the second gas stream tangentially as a vortex flow from the second vortex chamber into the first vortex chamber adjacent the inlet end of the first vortex chamber for flowing around at least a part of the inside of said first peripheral side wall of the first vortex chamber for at least partially separating said first gas stream from said first peripheral side wall;

means for dividing a gas stream into at least a first gas stream and a second gas stream and for introducing said first gas stream into the first inlet means in the first vortex chamber and said second gas stream into said second inlet means in the second vortex chamber;

means for introducing a material into said first gas stream in the first vortex chamber for mixing therewith; and outlet means at said outlet end of the first vortex chamber for continuously removing gas from the first vortex chamber.

2. An apparatus as recited in claim 1 wherein said transfer means comprises an opening through the first side wall in the form of a vertical slot for introducing said second gas stream into said first vortex chamber along the first wall thereof in a circular flow around the axis of said chamber.

3. An apparatus as recited in claim 1 wherein the openings through the first side wall contain a guide plate forming an angle with the outer periphery of the first side wall for guiding a second gas stream in a controlled direction to the first vortex chamber.

4. An apparatus as recited in claim 1 further comprising a damper in the means for dividing the gas stream for regulating the proportion of first gas stream to second gas stream.

5. An apparatus as recited in claim 1 wherein said second vortex chamber includes annular housing means surrounding at least part of the first peripheral side wall at the inlet end of the first vortex chamber and providing a flow path for the second gas stream around at least a part of the first vortex chamber.

6. An apparatus as recited in claim 1 wherein said transfer means comprises a plurality of radially and angularly distributed gas inlet openings through an end wall at the inlet end of said first vortex chamber.

7. An apparatus as recited in claim 1 wherein said transfer means comprises an opening through the first side wall in the form of a vertical slot including a guide plate for introducing the second gas stream tangentially into the first vortex chamber along the first wall thereof in a circular flow around the axis of said first vortex chamber.

8. An apparatus as recited in claim 1 wherein said transfer means comprises a plurality of axially and angularly distributed gas inlet openings through the first peripheral side wall of said first vortex chamber including a guide plate for introducing the second stream tangentially into said second vortex chamber counter to the flow of said first stream.

9. An apparatus as recited in claim 8 further comprising a damper in the means for dividing the gas stream for regulating the proportion of first gas stream to second gas stream.

10. A method as recited in claim 9 wherein the gas flow is split immediately in front of the inlet duct of the vortex reactor.

11. An apparatus as recited in claim 8 wherein said second vortex chamber includes annular housing means surrounding at least a part of the first peripheral side wall at the inlet end of the first vortex chamber and providing a flow path for the second gas stream around at least a part of the first vortex chamber.

12. An apparatus as recited in claim 11 further comprising a damper in the means for dividing the gas stream for regulating the proportion of first gas stream to second gas stream.

13. An apparatus as recited in claim 11 wherein said transfer means comprises a plurality of radially and angularly distributed gas inlet openings through an end wall at the inlet end of the said first vortex chamber.

14. An apparatus as recited in claim 1 wherein said transfer means comprises a plurality of axially and angularly distributed gas inlet openings through the first peripheral side wall of said first vortex chamber for introducing said second gas stream into said first vortex chamber counter to the flow of said first stream.

15. An apparatus as recited in claim 14 wherein the openings through the first side wall contains a guide plate for introducing the second gas stream tangentially into the first vortex chamber.

16. A method of mixing a fluid stream into a gas stream, utilizing a vortex reactor, having a first generally cylindrical vortex chamber having an inlet and an outlet end, a second generally cylindrical vortex chamber disposed concentrically outside said first vortex chamber, and transfer means for introducing a gas stream tangentially from the second vortex chamber into the first vortex chamber, comprising the steps of:

dividing a gas stream into at least a first and a second gas stream;

introducing said first gas stream through an inlet duct tangentially as a vortex flow into said first vortex chamber at the inlet end of said first vortex chamber;

introducing a fluid stream into said first vortex chamber at the inlet end of the first vortex chamber for mixing the fluid stream into the first gas stream;

directing the second gas stream tangentially as a vortex flow into said second vortex chamber in the inlet end of said first vortex chamber;

introducing gas from said second gas stream in the second vortex chamber through said transfer means into the first vortex chamber at a tangent thereto; and continuously removing gas through the outlet end of the first vortex chamber.

17. A method as recited in claim 16 wherein the fluid stream contains fine dispersed liquid droplets.

18. A method as recited in claim 16 wherein the fluid stream contains fine dispersed solid particles.

19. A method as recited in claim 16 wherein the fluid stream contains gaseous compounds.

20. A method as recited in claim 16 wherein the fluid stream is introduced into a hot flue gas stream in a vortex reactor for gas cleaning.

21. A method as recited in claim 16 wherein the second gas stream is introduced tangentially into the first vortex chamber and substantially in the opposite direction to the gas flow in the first vortex chamber for improving the mixing of gas and reactant.

22. A method as recited in claim 16 wherein the second gas stream is directed in heat exchange contact with a peripheral wall of the first vortex chamber.

23. A method as recited in claim 22 wherein the second gas stream is directed for heating the peripheral wall of the first vortex chamber.

24. A method as recited in claim 22 wherein the second gas stream is directed for cooling the peripheral wall of the first vortex chamber.

25. A method as recited in claim 22 wherein the first gas stream is introduced tangentially into the first vortex chamber for creasing a generally circular gas flow in said first vortex chamber.

26. A method as recited in claim 25 wherein the fluid stream is introduced substantially into the center of the circular gas flow at the inlet end of the first vortex chamber.

27. A method as recited in claim 25 wherein the second gas stream is introduced tangentially through a plurality of openings in a peripheral wall into the first vortex chamber and in the same direction as the circular gas flow in the first vortex chamber.

28. A method of establishing minimum contact between liquid droplets dispersed into a hot gas flow and gaseous compounds in the gas flow, utilizing a vertical vortex reactor having a first generally cylindrical vortex chamber having an upper inlet end and a lower outlet end, a second generally cylindrical vortex chamber disposed concentrically outside said first vortex chamber, and transfer means for introducing a gas stream tangentially from the second vortex chamber into the first vortex chamber, comprising the steps of:

splitting the gas flow into a first larger gas flow and a second smaller gas flow;

feeding the first gas flow tangentially through an inlet duct into an upper part of the first vortex chamber for forming a vortex gas flow;

dispersing the liquid droplet into the vortex gas flow in the inlet end of the first vortex chamber for mixing the liquid droplets with the first gas flow;

directing the second gas flow in the second vortex chamber in a path surrounding the upper part of the first vortex chamber for heating the upper part of the walls of the first vortex chamber;

introducing gas from the second gas flow into the first vortex chamber through the transfer means for gradually contacting the second gas flow with the first gas flow and the dispersed liquid droplets; and continuously removing gas from the first vortex chamber at the outlet end.

29. A method as recited in claim 28 wherein the gas introduced through transfer means is introduced in the opposite direction to the vortex flow in the first vortex chamber.

30. A method as recited in claim 28 wherein droplets containing desulphurizing reagents are dispersed into a hot flue gas flow.

31. A method of mixing a fluid stream forming sticky compounds into a gas stream, utilizing a vortex reactor having a first generally cylindrical vortex chamber having an upper inlet end and a lower outlet end, a second generally cylindrical vortex chamber disposed concentrically outside said first vortex chamber, and transfer means for introducing a gas stream tangentially from the second vortex chamber into the first vortex chamber, comprising the steps of:

splitting the gas stream into a first and a second gas stream before introducing the gas into an inlet end of the vortex reactor;

introducing the first gas stream tangentially into said inlet end of the first vortex chamber for creating a whirling gas stream in the first vortex chamber;

introducing the fluid stream substantially into the center of the whirling gas stream at said inlet end of the first vortex chamber;

directing the second gas stream into the second vortex chamber at the inlet end of the first vortex chamber, in heat exchange contact with at least a part of a peripheral wall of the first vortex chamber;

introducing the second gas flow tangentially through the transfer means for providing a shielding gas flow at the outer periphery inside the first vortex chamber for preventing sticky particles from depositing on the peripheral wall of the first vortex chamber and for gradually mixing the second gas stream into the whirling gas stream in the first vortex chamber; and continuously removing gas at said outlet end of the first vortex chamber.

* * * * *

UNITED STATES PATENT AND TRADEMARK OFFICE
CERTIFICATE OF CORRECTION

PATENT NO. : 5,024,684
DATED : June 18, 1991
INVENTOR(S) : John T. Tang

It is certified that error appears in the above—identified patent and that said Letters Patent is hereby corrected as shown below:

On the title page and item [19], change the spelling of the inventor's last name from "Tank" to --Tang--.

Signed and Sealed this

First Day of December, 1992

Attest:

DOUGLAS B. COMER

Attesting Officer

Acting Commissioner of Patents and Trademarks